United States Patent
Laprade

(10) Patent No.: US 7,622,171 B2
(45) Date of Patent: Nov. 24, 2009

(54) HEAT TRANSFER LABEL

(75) Inventor: Jean-Paul Laprade, N. Smithfield, RI (US)

(73) Assignee: Multi-Color Corporation, Sharonville, OH (US)

( * ) Notice: Subject to any disclaimer, the term of this patent is extended or adjusted under 35 U.S.C. 154(b) by 415 days.

(21) Appl. No.: 11/380,762

(22) Filed: Apr. 28, 2006

(65) Prior Publication Data

US 2007/0254116 A1    Nov. 1, 2007

(51) Int. Cl.
 B41M 5/40 (2006.01)
(52) U.S. Cl. .............. 428/32.79; 428/32.6; 428/32.77; 428/32.78; 428/343; 428/348; 428/349; 428/354
(58) Field of Classification Search .......... 428/32.6, 428/32.77, 32.78, 32.79, 343, 346, 347, 348, 428/349, 352, 354, 355 R
 See application file for complete search history.

(56) References Cited

U.S. PATENT DOCUMENTS

| | | | |
|---|---|---|---|
| 3,944,695 A | | 3/1976 | Kosaka et al. |
| 4,557,964 A | * | 12/1985 | Magnotta ................. 428/187 |
| 4,581,266 A | | 4/1986 | Magnotta |
| 4,935,300 A | | 6/1990 | Parker et al. |
| 5,156,708 A | | 10/1992 | Mizutani |
| 5,269,865 A | | 12/1993 | Kushida et al. |
| 5,376,432 A | | 12/1994 | Umise et al. |
| 5,414,039 A | | 5/1995 | Watson et al. |
| 5,685,758 A | * | 11/1997 | Paul et al. ................. 442/409 |
| 5,766,731 A | | 6/1998 | Stein et al. |
| 5,908,694 A | | 6/1999 | Makar et al. |
| 5,972,481 A | | 10/1999 | Stein et al. |
| 6,042,676 A | | 3/2000 | Stein |
| 6,344,269 B1 | | 2/2002 | Makar et al. |
| 6,610,397 B1 | | 8/2003 | Patel et al. |
| 6,793,989 B1 | | 9/2004 | Patel et al. |
| 6,797,747 B1 | | 9/2004 | Patel et al. |
| 6,887,951 B1 | | 5/2005 | Patel et al. |

(Continued)

FOREIGN PATENT DOCUMENTS

EP    0732440 A1    9/1996

(Continued)

OTHER PUBLICATIONS

E.I. DuPont de Nemours & Co., Technical Reference Materials, "DuPont Elvax Grade Selection Guide for Adhesives, Sealants and Wax Blends", 2005, available at http://www.dupont.com/industrial-polymers/elvax/H-19829-3/H-19829-3.html.*

(Continued)

*Primary Examiner*—Bruce H Hess
*Assistant Examiner*—David J Joy
(74) *Attorney, Agent, or Firm*—Wood, Harron & Evans, LLP

(57) ABSTRACT

A heat transfer label comprising a support portion and a transfer portion for transfer of the transfer portion from the support portion to an article. The article may be untreated polyethylene, polypropylene, PET, or acrylonitrile. Heat is applied to the support portion while the transfer portion is placed into contact with the untreated polyethylene, polypropylene, or acrylonitrile article. The transfer portion comprises an adhesive layer comprising a vinyl acetate resin, a tackifying petroleum hydrocarbon resin, and a microcrystalline wax.

19 Claims, 1 Drawing Sheet

U.S. PATENT DOCUMENTS

| | | |
|---|---|---|
| 6,902,641 B1 | 6/2005 | Patel et al. |
| 2004/0221945 A1 | 11/2004 | Williams et al. |

FOREIGN PATENT DOCUMENTS

| | | | |
|---|---|---|---|
| EP | 1346838 | A2 | 9/2003 |

OTHER PUBLICATIONS

ExxonMobil Chemical, Escorez—Grades & Datasheets, "Escorez 5300 Series", 2002, available at http://www.exxonmobil.com/Public_Files/Adhesion/Resins/NorthAmerica/Sales_Specification_Escorez_tackifying_resin_5300_Series.pdf.*

International Search Report, PCT/US2007/067619, 2 pgs.

* cited by examiner

HEAT TRANSFER LABEL

FIELD OF THE INVENTION

The present invention relates generally to labels for various articles, and relates more specifically to heat transfer labels for articles, such as containers.

BACKGROUND OF THE INVENTION

Heat transfer labels are commonly used in the decorating and/or labeling of commercial articles, such as, and without limitation, containers for beverages, essential oils, detergents, adverse chemicals, and health and beauty aids. Heat transfer labels are desirably resistant to abrasion and chemical effects in order to avoid a loss of label information and desirably possess good characteristics of adhesion to the articles to which they are affixed.

Heat transfer labels are multilayered laminates, with each layer having its own function. For example, heat transfer labels generally include an adhesive layer, an ink design layer, and a release layer. The release layer may be a wax release layer, and is often directly adjacent a carrier sheet, such as on a roll or web of labels. Thus, in such an example, the label may be thought to include a "support portion" (e.g., carrier sheet and release layer and a "transfer portion" (i.e., ink design layer and adhesive layer). When subjected to heat, the wax release layer melts, thereby allowing the transfer portion to be separated from the carrier sheet, and the adhesive layer adheres the ink design layer to an article being labeled. Alternatively, all or part of the wax release layer may transfer as well, to provide protection to the ink design layer. Additionally or alternatively, the labels may include a separate protective layer overlying the ink design layer to protect the ink design layer from abrasion.

More specifically, in the heat transfer labeling process, the label-carrying sheet is subjected to heat, and the label is pressed onto an article with the ink design layer making direct contact with the article. As the paper sheet is subjected to heat, the wax layer begins to melt so that the paper sheet can be released from the ink design layer. (And, as described above, a portion of the wax layer may be transferred with the ink design layer and a portion of the wax layer may remain with the paper sheet.) After transfer of the ink design layer to the article, the paper sheet is removed, leaving the ink design layer firmly affixed to the article. In an alternate embodiment, where the wax layer also transfers, the wax layer thus may serve two purposes: (1) to provide release of the ink design layer from the sheet upon application of heat to the sheet, and (2) to form a protective layer over the transferred ink design layer. After transfer of the label to the article, the transferred wax release layer may be subjected to a postflaming technique which enhances the optical clarity of the layer (thereby enabling the ink design layer therebeneath to be better observed) and which enhances the protective properties of the transferred wax layer.

Such heat transfer labels have been used to decorate a variety of articles, such as polyethylene, polypropylene, PET, and acrylonitrile articles. For example, such articles may include high-density polyethylene (HDPE) containers, low-density polyethylene (LDPE) containers, and polypropylene containers. One example of a heat transfer label that has been used to decorate polyethylene (PE) containers includes a paper carrier sheet overcoated with a wax release layer (approximately 6-8 lbs. wax/3,000 square feet of paper carrier web). A protective lacquer layer including a polyester resin is printed on the wax release layer. An ink design layer including a polyamide resin is printed on the protective lacquer layer. A heat-activatable adhesive layer including a polyamide resin is printed on the ink design layer.

One disadvantage associated with the use of the aforementioned label, and similar heat transfer labels, on polyethylene, polypropylene, PET, and/or acrylonitrile, is that the label will not adhere to a polyethylene, polypropylene, PET, or acrylonitrile surface unless the surface has previously been treated by some oxidizing technique. It is known to those skilled in the art that to effect a bond between article surface and an adhesive including a polyamide, the article surface needs to be oxidized first, as described above. This also is the case for adhesives including chlorinated polyolefins. Such adhesives also need the article surface to be oxidized in order to effectively bond to the article, as described above. Typical oxidizing techniques include flaming the polyethylene, polypropylene, PET, or acrylonitrile surface with an oxidizing flame. Without wishing to be limited to any particular theory as to why pretreatment of the polyethylene, polypropylene, PET, or acrylonitrile surface is necessary for the aforementioned label to adhere thereto, it is believed that untreated polyethylene, untreated polypropylene, untreated PET, or untreated acrylonitrile is a low energy surface made up primarily of hydrocarbons, whereas oxidized or treated polyethylene, polypropylene, PET, or acrylonitrile is a relatively higher energy surface which additionally includes ketones, carboxylic acid groups, etc. Accordingly, because the pretreated polyethylene, polypropylene, PET, or acrylonitrile surface is a higher energy surface than the untreated polyethylene, polypropylene, PET, or acrylonitrile surface, it is more receptive to binding to the adhesive layer of the label. However, pretreatment of the article results in increased time, equipment, and cost in labeling the article.

Thus, it would be desirable to provide a heat transfer label that is particularly well suited for use on untreated polyethylene, polypropylene, PET, or acrylonitrile surfaces, such as untreated high, medium, or low density polyethylene surfaces and/or untreated high, medium, or low density polypropylene surfaces.

SUMMARY OF THE INVENTION

The present invention overcomes the drawbacks described above by providing a heat transfer label, which includes (a) a support portion; and (b) a transfer portion over the support portion for transfer of the transfer portion from the support portion to an article upon application of heat to the support portion while the transfer portion is placed into contact with the article, the transfer portion including an adhesive layer including a vinyl acetate resin (such as an ethylene vinyl acetate resin), a tackifying petroleum hydrocarbon, and a microcrystalline wax. The transfer portion may further include (i) a protective lacquer layer, and (ii) an ink design layer proximal to the protective lacquer layer. The label may further include a wax release layer or wax-like release layer interposed between the support portion and the transfer portion. Thus, the protective lacquer layer may be interposed between the wax layer (or wax-like layer) and the ink layer.

The adhesive of the label of the present invention can bond to nonoxidized polyethylene, polypropylene, PET, and acrylonitrile surfaces, and thus allows for the elimination of surface pretreatment of the article being labeled. In addition to being directed to the above-described heat transfer label, the present invention is also directed to a method of labeling an untreated polyethylene, polypropylene, PET, or acrylonitrile surface with the above-described heat transfer label.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Figure 1:
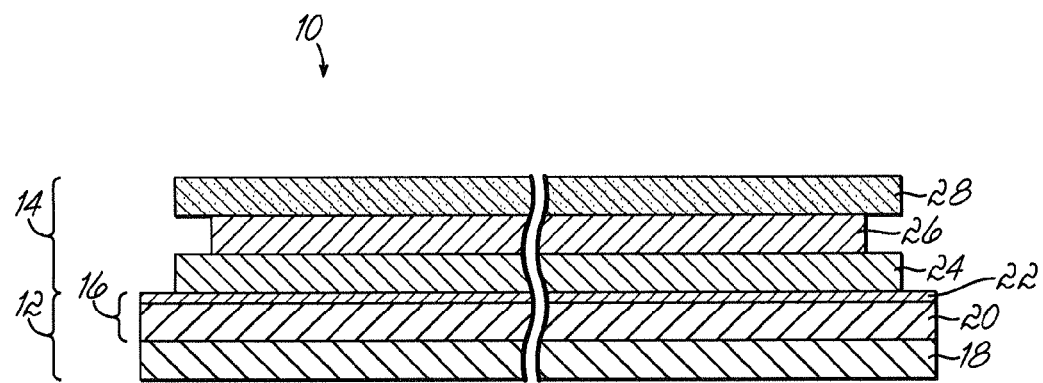
FIG. 1 is a schematic section view of a heat transfer label that is particularly well suited for use on untreated polyethylene, polypropylene, PET, or acrylonitrile surfaces, in accordance with the principles of the present invention.

Referring now to FIG. 1, there is shown a schematic section view of an embodiment of a heat transfer label 10 that is particularly well suited for use on untreated polyethylene, polypropylene, PET, or acrylonitrile surfaces, such as untreated high-density polyethylene containers, untreated low-density polyethylene containers, untreated high-density polypropylene containers, and untreated low-density polypropylene containers.

The label 10 includes a support portion 12 and a transfer portion 14. The support portion 12 may include a carrier sheet 18, which is typically paper or a similarly suitable substrate, and a release portion 16, which is overcoated onto the carrier sheet 18. The release portion 16 may include (1) a nonwax release layer 20, and (2) a skim coat 22. The nonwax release layer 20 may include a layer of polyethylene or a layer of polypropylene. Details of such a polyethylene layer are disclosed in U.S. Pat. Nos. 4,935,300 and 4,927,709, both of which are incorporated herein by reference in their entireties. The skim coat 22 may include wax and may be coated directly on top of the polyethylene or polypropylene layer. During label transfer, a small portion of the skim coat 22 may be transferred along with the transfer portion 14 of the label 10 onto the article being labeled. However, the amount of the skim coat 22 transferred onto the article being labeled is generally not readily discernible.

The transfer portion 14 may include a protective lacquer layer 24 printed directly on top of at least a portion of the skim coat 22, an ink design layer 26 printed onto a desired area of lacquer layer 24, and an adhesive layer 28 printed over the ink design layer 26. The adhesive layer 28 may be printed onto a surrounding portion of the lacquer layer 24.

One example of such a heat transfer label 10, as described above with respect to FIG. 1, is the CLEAR ADVANTAGE® label, commercially available from Multi-Color Corporation of Cincinnati, Ohio, the assignee of the present application. The CLEAR ADVANTAGE® heat transfer label includes a carrier sheet 18 of one-sided clay-coated paper (at 28 pounds per ream). The clay-coated side of the carrier sheet 18 is adjacent to a nonwax release layer 20 of high-density polyethylene that is extruded onto the paper (at 8 pounds per ream). A skim coat 22 (generally a carnauba wax emulsion) is layered on top of the high-density polyethylene (at 0.25 to 1.0 pound per ream). The high-density polyethylene nonwax release layer 20 and skim coat 22 together form the release portion 16 of the support portion 12. The release portion 16 and the carrier sheet 18 together form the support portion 12. The transfer portion 14 is formed from a protective lacquer layer 24, an ink layer 26, and an adhesive layer 28. The protective lacquer layer in the CLEAR ADVANTAGE® heat transfer label includes materials having release characteristics. The release portion 16 is not entirely wax, and so the lacquer layer 24 of the transfer portion needs some "help" in transferring from the support portion 12. The ink layer in the CLEAR ADVANTAGE® label may be chosen from (1) polyester binder with a pigment, (2) vinyl binder with a pigment, or (3) acrylic binder with a pigment. Examples of materials for the protective lacquer layer 24 and ink layer 26 will be described in greater detail below. The adhesive layer 28 of the transfer portion 14 may be heat-activatable. In one embodiment, the adhesive layer 28 may include a vinyl acetate resin (such as an ethylene vinyl acetate resin), a tackifying petroleum hydrocarbon resin, and a microcrystalline wax. The adhesive layer 28 will be described in greater detail below.

Figure 2:
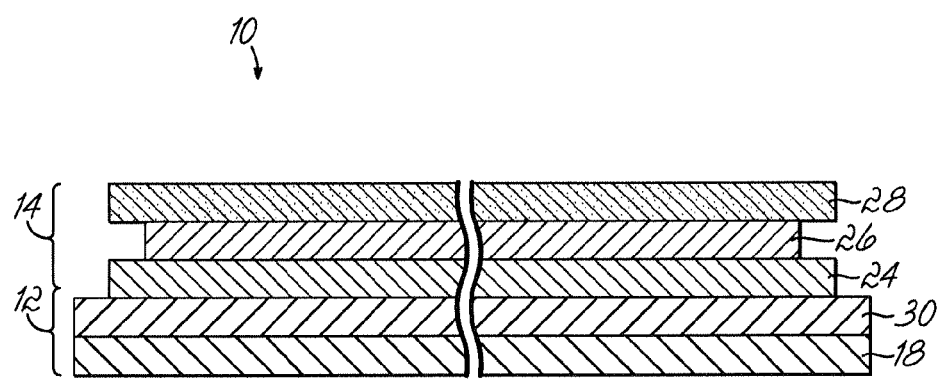
FIG. 2 is a schematic section view of another heat transfer label that is particularly well suited for use on untreated polyethylene, polypropylene, PET, or acrylonitrile surfaces, in accordance with the principles of the present invention.

Referring now to FIG. 2, there is shown a schematic section view of a second embodiment of a heat transfer label 10 that is particularly well suited for use on untreated polyethylene, polypropylene, PET, or acrylonitrile surfaces. This label 10 also includes a support portion 12 and a transfer portion 14. The support portion 12 may include a carrier sheet 18, which is typically paper or a similarly suitable substrate, and a wax release layer 30, which is overcoated onto the carrier sheet. During label transfer, a small portion of the wax release layer 30 may be transferred along with the transfer portion 14 of the label 10 onto the article being labeled. Any wax that transfers may thereafter be subjected to a postflaming technique.

As described above, the transfer portion 14 may include a protective lacquer layer 24 printed directly on top of at least a portion of the wax release layer 30, an ink design layer 26 printed onto a desired area of the lacquer layer 24, and an adhesive layer 28 printed over the ink design layer 26. The adhesive layer 28 may be further printed onto a surrounding portion of the lacquer layer 24.

One example of such a heat transfer label 10, as described above with respect to FIG. 2, is the THERIMAGE® label, commercially available from Multi-Color Corporation of Cincinnati, Ohio, the assignee of the present application. The THERIMAGE® heat transfer label includes a carrier sheet 18 of one side clay-coated paper (at 29.5 pounds per ream). The clay-coated side is adjacent to a wax release layer 30 (of either 75SR wax or 65RC wax, which will be described below). This wax is melted and flood-coated onto the one-sided clay-coated carrier sheet 18. The wax has a coat weight of 7 pounds per ream. The carrier sheet 18 and the wax release layer 30 form the "support portion" 12 of the label. The transfer portion 14 is formed of a protective lacquer layer 24, an ink layer 26, and an adhesive layer 28. More specifically, the protective lacquer layer can be a ViTEL® polyester. This layer has no release additives in the polyester. Release additives are not needed, since the wax release layer 30 is made entirely of wax and resin, and completely melts during the transfer process. Thus, it does not need any "help" in releasing. The ink layer 26 can be a polyamide binder with pigment or an acrylic binder with pigment. This ink layer 26 is gravure-applied to the protective lacquer layer 24. And finally, the adhesive layer 28 used in the THERIMAGE® label is that which is described above with respect to the CLEAR ADVANTAGE® label, and which will be described in greater detail below.

Thus, the labels 10 of FIGS. 1 and 2 are similar in their constructs, with each including a carrier sheet 18, release layer (wax 30 or nonwax 20), protective lacquer layer 24, ink layer 26, and adhesive layer 28. It will be recognized by those skilled in the art that the CLEAR ADVANTAGE® and THERIMAGE® labels described above are merely examples of heat transfer labels, and that any other heat transfer labels may be used in the present invention. Those other labels may or may not include all of the various layers described above. Materials that may be used in each of those layers will now be described in greater detail.

The protective lacquer layer 24 may include a release agent and at least one of a hard polyester resin or an acrylic resin. An example of a hard polyester resin is ViTEL® 2300 (Shell Chemical Company, Akron, Ohio), a copolyester resin having a high tensile strength of 8000 psi, a low elongation of 7%, a 79 D scale Shore Durometer hardness, and a 156° C. ring and ball melt flow point. An example of a lacquer composition for use in forming protective lacquer layer 24 is the following: ViTEL® 2300 (21.4% by weight); nitrocellulose (4.5% by weight); AEROSOL® OT-MSO dioctyl sodium sulfosuccinate in mineral seal oil (4.5% by weight); castor oil (0.9% by weight); toluene (27.4% by weight); methyl ethyl ketone (MEK) (20.4% by weight); and ethyl acetate (20.4% by weight).

Other suitable examples of lacquer compositions for use in forming the protective lacquer layer 24 include the following example: ViTEL® 2300 (23.5% by weight); castor oil (1.07% by weight); toluene (30.1% by weight); methyl ethyl ketone (MEK) (22.5% by weight); and ethyl acetate (22.5% by weight). Then, carnauba wax or UNITHOX 750 polyethylene wax is added to the aforementioned mixture in an amount constituting 7%, by weight, of the total composition.

And, the following is another suitable example of a protective layer 24: BOSTIK 7922 polyester resin (20% by weight), (a semicrystalline, linear saturated polyester available from Emhart Corporation of Farmington, Conn., having a hardness of 65 Shore A, a specific gravity of 1.23, softening range (R&B) of 275° F.-297° F., a solution viscosity (30% solids in 50/50 MEK/Toluol) of 60-200 cps and a solution viscosity (30% solids in ethyl acetate) of approximately 300-400 cps); VAGH vinyl resin (5% by weight), (a vinyl resin solution available from Union Carbide Chemicals, Danbury, Conn., having a polymer composition by percentage weight of 90 VCl, 4 VAc and 6 vinyl alcohol, an average molecular weight of 27,000, a glass transition temperature of 79° C., a specific gravity ASTM D792 of 1.39 and a solution viscosity at 25° C. of 1000 cP); nitrocellulose (1.7% by weight); castor oil (0.8% by weight); UNITHOX 750 ethoxylated alcohol (7% by weight); MEK (26.2% by weight); toluene (19.6% by weight); and ethyl acetate (19.6% by weight).

Still yet another alternative example comprises the lacquer composition used to make the label of U.S. Pat. No. 5,766,731 (the disclosure of which is incorporated herein by reference), to which carnauba wax or UNITHOX 750 ethoxylated alcohol has been added.

In one exemplary method of forming the protective lacquer layer 24 using any of the aforementioned lacquer compositions, the lacquer composition is deposited onto a desired area of the skim coat 22 (in the embodiment of FIG. 1) or wax release layer 30 (in the embodiment of FIG. 2), preferably by gravure printing or a similar technique. After deposition of the lacquer composition onto the desired area of the skim coat 22 or wax release layer 30, the deposited layer is heated, causing the volatile components thereof to evaporate and leaving only the nonvolatile components thereof to make up the protective lacquer layer 24.

The ink design layer 26 of the transfer portion 14 may include a conventional polyamide ink (such as in a THERIMAGE® label), which may take the form described in one or more of the above-referenced patents. The ink design layer 26 is formed in the conventional manner by depositing, by gravure printing or the like, an ink composition comprising a polyamide resin, a suitable pigment or dye, and one or more suitable volatile solvents onto one or more desired areas of the protective lacquer layer 24. After application of the ink composition onto the protective lacquer layer 24, the deposited layer is heated, causing the volatile solvent component(s) of the ink solvent system to evaporate and leaving only the nonvolatile components thereof to form the ink design layer 26. As described above, alternative ink design layers may include an acrylic binder. And in the case of at least the CLEAR ADVANTAGE® label, the ink may include a polyester binder or a vinyl binder.

The adhesive layer 28 of the transfer portion 14 includes a vinyl acetate resin, a tackifying petroleum hydrocarbon, and a microcrystalline wax. One example of a vinyl acetate resin is an ethylene vinyl acetate resin. An example of the ethylene vinyl acetate resin is ELVAX® 40-W, a 39-42% vinyl acetate, medium to low viscosity (0.70 cP at 30° C. and 0.25 g 1100 ml toluene) resin commercially available from ICI Acrylics, Inc. (Wilmington, Del.), which is soluble in organic solvents and has a bulk density of 30 lb/ft$^3$ (ASTM-D 1895/B), a ring and ball softening point of 200° C. and a melt index of 48-66 grams per 10 minutes (ASTM-D 1238 modified).

The adhesive layer 28 of the transfer portion 14 also includes a hydrocarbon resin, such as a tackifying petroleum hydrocarbon. An example of the tackifying petroleum hydrocarbon as used in the present invention is Escorez 1315 from ExxonMobil Chemical. The hydrocarbon resin promotes adhesion of the label to the nonoxidized article surface.

The adhesive layer 28 of the transfer portion 14 also includes a microcrystalline wax. The microcrystalline component of wax release layer 30 may be composed of saturated hydrocarbons of higher melting point than those of paraffin wax. Microcrystalline waxes characteristically contain between about $C_{34}H_{70}$ to $C_{60}H_{120}$ hydrocarbons having molecular weight between about 478 and 840. Microcrystalline waxes (microwaxes) are characterized by an increased amount of branching; although they contain straight chain molecules, they are not as linear a saturated hydrocarbon as paraffin wax. Also compared to paraffin wax, they contain a greater portion of cyclic ring molecules. The crystalline structure of the microcrystalline wax contains predominantly malcrystalline and needle-like crystals having very small, undefined form when compared with the plate-like crystalline structure of paraffin wax under the same magnification. Thus, the crystalline structure of microcrystalline wax is small and irregular when solidified from the melted wax. In solvents, microcrystalline wax discloses no well-formed crystals of any size. Small amounts of microwax may be added to the formulation for wax release layer 30, since microwax imparts a measure of plasticity to the paraffin wax components, since the paraffin wax is rather brittle and would, by itself, tend to cause cracks or fissures in a wax release layer 30. Because of its diminished crystalline structure, microwax contributes little potential hazing or halo effect.

The classes of microwaxes vary principally in their melting point range. For example, the so-called hard microwaxes have a melting point between about 190° F.-210° F.; the plastic microwaxes a melting point between about 145° F.-175° F.; the emulsifiable crystalline waxes between about 190° F.-225° F.; and modified microwaxes between about 165° F.-220° F. All of these various types of microwaxes may be employed in the present formulation. An illustrative, commercially available microcrystalline wax that is particularly suitable in the present formulation is available under the Victory White trade name from the Petrolite Corporation.

The microcrystalline wax also promotes adhesion of the label 10 to a nonoxidized article surface. More specifically, the microcrystalline wax allows the formulation of the adhesive to tackify more aggressively at a given transfer temperature. This temperature is generally about 260° F. in one embodiment of the present invention. The presence of the microcrystalline wax in the formulation imparts a sharper melting point to the formulation, thereby making the adhesive more aggressive at a given temperature.

Further, the microcrystalline wax helps prevent or minimize the potential for label blocking when the labels 10 are in roll form. As is well known to those skilled in the art, when labels are packaged in a roll, the labels contact one another, such that the adhesive on one label may come into contact with a surface of an adjacent label. Should the roll of labels be inadvertently subjected to temperatures at which the adhesive will begin to tackify, the labels may adhere, i.e., become "blocked," to one another. The presence of the microcrystalline wax in the adhesive formulation softens and begins to flow at increased temperatures, and prevents bonding sufficient to block the labels.

One example of an adhesive composition that may be used to form the adhesive layer 28 has the following composition: 70% ELVAX® 40-W, 25% Escorez 1315, and 5% Victory White Wax dissolved to 25% solids in toluene.

The adhesive layer 28 may be formed by depositing onto the ink design layer 26, by gravure printing or the like, the aforementioned adhesive composition. The deposited composition is then heated, causing the volatile components of the composition to evaporate and leaving only the nonvolatile solid components thereof to form the adhesive layer 28.

The label 10 is particularly well suited for use with untreated polyethylene, polypropylene, PET, and acrylonitrile articles, such as high-density polyethylene articles, including untreated HDPE containers. Application of the label 10 to such items is preferably performed in the conventional thermal-transfer manner by contacting the adhesive layer 28 to the untreated high-density polyethylene container or other article, while applying sufficient heat to the back of the carrier web so as to cause the transfer portion 14 (and possibly a portion of the skim coat 22) to be released from the support portion 12, and so as to cause the adhesive layer 28 to become heat-activated for bonding of the transfer portion 14 to the desired article. Adhesion to the article can be measured by tape test.

Generally, in a tape test, a strip of tape is adhered to a heat transfer label 10 once the label 10 has been applied to an article, such as a bottle. Once the tape has been adhered and allowed to set, it is pulled from the label 10 in order to see whether the label 10 remained adhered to the article, or whether it is pulled away from the article by the tape. These tests are run using dry labels in order to determine whether the adhesion of the label 10 to article is sufficient under both dry and wet conditions.

Further, the surface energy of the substrate to which the label 10 is to be applied (i.e., the outer surface of an article) can be tested, in one embodiment, by using ACCU DYNE TEST™ Marker Pens, available from Diversified Enterprises, Claremont, N.H. First, a test article is obtained and the sample placed on a clean, level surface. The ambient temperature and relative humidity is recorded, and if the sample temperature differs from the ambient temperature, it is allowed to stabilize. At least three points across the sample are tested. The test occurs by taking an ACCU DYNE TEST™ Marker Pen and drawing a line across the surface to which the label will adhere. In particular, an ACCU DYNE TEST™ Marker Pen of a dyne level the tester believes is slightly lower than that of the test sample is chosen. The applicator tip of the marker is firmly pressed down on the subject material until the tip is saturated with ink. Using a light touch, the pen is then drawn across the test sample in two or three parallel passes. The first pass is used to flush any contamination from the tip, and to ensure that the test fluid layer is thin enough for accurate measurement. Only the last pass will be evaluated. If the last ink swath remains wetted out on the test sample for three seconds or more, a marker pen of the next higher dyne level is chosen and the test repeated. If the last ink swath beads up, tears apart, or shrinks into a thin line within one second or less, the next lower dyne level marker is chosen and the test repeated. If, however, the ink swath holds for one to three seconds before losing its integrity, the dyne level of the marker closely matches that of the sample. Thus, the ACCU DYNE TEST™ Marker Pens can be used to measure the surface energy of the nonoxidized substrates of the article to which the heat transfer labels 10 are to be applied.

The label 10 of the present invention is also suitable for a complete 360-degree wrap around an article being labeled. In previous wraparound labels, this was not possible due to the presence of a wax release layer. When the leading edge of a previous label was applied to an article, a portion of the wax release layer would be transferred to the article along with the label. Thus, the adhesive on the trailing edge of the label could not bond to the article because the wax layer on the leading edge was disposed between the article and the adhesive. In such a situation, the trailing edge could come free, which creates an unpleasant look to the label, and also provides a free edge such that the label might be damaged or pulled from the article. However, with the microcrystalline wax incorporated into the adhesive formulation, any trailing edge of the label of the present invention can overlap the leading edge without the problem of a separate wax layer preventing bonding of the trailing edge.

As mentioned above, one distinct advantage of the label 10 over existing heat transfer labels used on polyethylene, polypropylene, PET, and acrylonitrile articles is the fact that the label 10 does not require any oxidizing pretreatment of the aforementioned polyethylene, polypropylene, PET, or acrylonitrile container for the transfer portion 14 to adhere thereto. As a result, the time necessary to pretreat the container and the particular equipment needed for pretreatment can be eliminated, resulting in considerable savings.

After transfer of a heat transfer label 10 to an article, the transferred wax release layer 30 is typically subjected to a postflaming technique, which enhances the optical clarity of the wax release layer 30 (thereby enabling any ink design layer 26 therebeneath to be better observed), and which enhances the protective properties of the transferred wax release layer 30.

The wax release layer 30 may include various materials. Such materials may result in a matte finish or in a gloss finish. For examples of suitable materials for a matte wax release layer, see U.S. Pat. No. 4,536,434, the disclosure of which is incorporated by reference herein in its entirety. For examples of suitable materials for a gloss wax release layer, see U.S. Pat. No. 4,581,266, the disclosure of which is incorporated by reference herein in its entirety. That patent describes an exemplary formulation for the wax release layer 30 including paraffin and a montan wax, and which may also include a minor amount of microcrystalline wax. In addition to these waxes, the formulation may include a tackifying resin and suitable binder. With proper selection of tackifier resin, the total amount of crystallinity of the paraffin wax can be reduced. This can serve to reduce the amount of "haze" over the final transferred image. Although postflaming serves to reduce some of the hazing which appears over the transferred image it effects only a partial reduction and does not decrease the crystallinity of the wax components. Postflaming has been determined to increase clarity principally because it has the effect of smoothing microscopic hills and valleys on the surface of the transferred release layer. Postflaming thus creates a smoother, more uniform surface of glossy character, increases the overall clarity of the transferred release layer, and consequently the clarity of the transferred design image. Residual amount of opacity or hazing is believed to be caused by the crystalline structure of the solidified paraffin wax, and to a lesser degree, of the solidified microcrystalline wax, which contains crystals of much smaller size.

Further, the postflaming described herein merely enhances properties, such as those provided by the wax layer 30. It is not needed to achieve a bond between the label 10 and the article. That bond is achieved, through the present invention, without any oxidation. A postflaming process, however, may serve to otherwise enhance the bond.

The embodiments of the present invention recited herein are intended to be merely exemplary and those skilled in the art will be able to make numerous variations and modifications to it without departing from the spirit of the present invention. For example, to achieve optimal label integrity and optimal adherence between a label and an article, even under conditions of chemical and/or mechanical degradation, one generally seeks to maximize the adhesion between the label and the article and generally seeks to maximize the interlayer adhesion of the various layers of the label. Accordingly, the particular types of materials used in the adhesive, ink, and protective lacquer layers may be selected to optimize interlayer adhesion, article adhesion, and/or mechanical and chemical resistance suitable for the intended use of the article. In addition, the types of materials used in the various layers of the label may be selected with an eye towards the particular type of coating and/or printing processes that are to be used in the manufacture of the label. Notwithstanding the above, certain variations and modifications, while producing less than optimal results, may still produce satisfactory results. All such variations and modifications are intended to be within the scope of the present invention as defined by the claims appended hereto.

What is claimed is:

1. A heat transfer label comprising:
   (a) a support portion;
   (b) a transfer portion over said support portion for transfer of the transfer portion from the support portion to an article that has not undergone an oxidizing treatment upon application of heat to the support portion while the transfer portion is placed into contact with the article, said transfer portion including at least
      an ink layer; and
      an adhesive layer comprising a vinyl acetate resin, a tackifying petroleum hydrocarbon resin, and a microcrystalline wax;
      wherein said ink layer is disposed between said adhesive layer and said support portion.

2. The heat transfer label of claim 1, wherein said vinyl acetate resin is an ethylene vinyl acetate resin further comprising a 39-42% vinyl acetate resin which is soluble in organic solvents and has a bulk density of about 30 lb/ft$^3$, a ring and ball softening point of about 200° C., and a melt index of 48-66 grams per 10 minutes.

3. The heat transfer label of claim 2, wherein said vinyl acetate resin is 70% of said adhesive layer, said tackifying petroleum hydrocarbon resin is 25% of said adhesive layer, and said micrycrystalline wax is 5% of said adhesive layer.

4. The heat transfer label of claim 1, wherein said vinyl acetate resin is an ethylene vinyl acetate resin having a vinyl acetate content of between 18 and 42 percent.

5. The heat transfer label of claim 4, wherein said tackifying petroleum hydrocarbon resin has a Tg range of between 30° C. and 85° C.

6. The heat transfer label of claim 1, wherein said tackifying petroleum hydrocarbon resin has a Tg range of between 30° C. and 85° C.

7. The heat transfer label of claim 1, wherein said microcrystalline wax further includes a melting point of 150-180° F., a hardness of greater than 10 dmm at 77° F., and is 30-60% normal paraffins.

8. The heat transfer label of claim 1, wherein said transfer portion further comprises a protective lacquer layer.

9. The heat transfer label of claim 8, wherein said protective lacquer layer further comprises a hard polyester or acrylic resin being a copolyester resin having a high tensile strength of 8000 psi, a low elongation of 7%, a 79 D scale Shore Durometer hardness, and a 156° C. ring and ball melt flow point.

10. The heat transfer label of claim 8, wherein said transfer portion further comprises a release agent and at least one of a hard polyester resin and an acrylic resin.

11. The heat transfer label of claim 10, wherein said release agent is a surfactant or a wax.

12. The heat transfer label of claim 11, wherein said release agent is selected from the group consisting of dioctyl sodium sulfosuccinate in mineral seal oil, ethoxylated alcohol, and carnauba wax.

13. The heat transfer label of claim 12, wherein said release agent is carnauba wax.

14. The heat transfer label of claim 8, wherein said ink layer is proximal to said protective lacquer layer.

15. The heat transfer label of claim 14, said ink layer comprising a resin chosen from a polyamide, a polyester, a vinyl, and an acrylic.

16. The heat transfer label of claim 15, wherein said ink layer comprises a polyamide resin, and said polyamide resin is a clear alcohol soluble polyamide resin based on dimerized vegetable acid and aliphatic polyamines and having a Brookfield viscosity at 160° C. of 4-7 poise, a softening point of 105-115° C. and a Gardner color (maximum) of 7.

17. The heat transfer label of claim 1, further comprising a release Layer interposed between said support portion and said transfer portion, the release Layer chosen from a wax release layer having wax in an amount of 6 to 8 pounds per 3,000 ft$^2$ of said support portion, or a non-wax release layer including a wax skim coat in the amount of 0.25 to 1.00 pound per ream.

18. The heat transfer label of claim 1, wherein said support portion includes a sheet of paper.

19. The heat transfer label of claim 18, wherein said support portion comprises one-sided clay-coated paper.

* * * * *

UNITED STATES PATENT AND TRADEMARK OFFICE
CERTIFICATE OF CORRECTION

PATENT NO. : 7,622,171 B2  Page 1 of 1
APPLICATION NO. : 11/380762
DATED : November 24, 2009
INVENTOR(S) : Laprade It is certified that error appears in the above-identified patent and that said Letters Patent is hereby corrected as shown below:

Title Page, Column 2,
Item (74) "Wood, Harron & Evans, LLP" should be -- Wood, Herron & Evans, LLP --.

Column 1,
Line 26, "release layer" should be -- release layer) --.

Column 10,
Line 6 (claim 3), "micrycrystalline wax" should be -- microcrystalline wax --.
Line 51 (claim 17), "Layer" should be -- layer --.
Line 52 (claim 17), "Layer" should be -- layer --.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO.        : 7,622,171 B2  Page 1 of 1
APPLICATION NO. : 11/380762
DATED             : November 24, 2009
INVENTOR(S)       : Jean-Paul Laprade It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this

Fourteenth Day of December, 2010

David J. Kappos
*Director of the United States Patent and Trademark Office*